(12) United States Patent
Caldelas, II et al.

(10) Patent No.: US 12,278,416 B2
(45) Date of Patent: Apr. 15, 2025

(54) GAS INJECTION SYSTEM FOR PLASMA BLACKOUT ALLEVIATION STUDIES

(71) Applicant: Massachusetts Institute of Technology, Cambridge, MA (US)

(72) Inventors: Humberto L. Caldelas, II, Severn, MD (US); Wesley Harris, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 460 days.

(21) Appl. No.: 17/863,784

(22) Filed: Jul. 13, 2022

(65) Prior Publication Data

US 2023/0019034 A1    Jan. 19, 2023

Related U.S. Application Data

(60) Provisional application No. 63/221,437, filed on Jul. 13, 2021.

(51) Int. Cl.
| | |
|---|---|
| *H01Q 1/28* | (2006.01) |
| *B64G 1/62* | (2006.01) |
| *B64G 1/66* | (2006.01) |
| *H01Q 1/00* | (2006.01) |
| *B33Y 80/00* | (2015.01) |

(52) U.S. Cl.
CPC .............. *H01Q 1/002* (2013.01); *B64G 1/62* (2013.01); *B64G 1/66* (2013.01); *H01Q 1/28* (2013.01); *B33Y 80/00* (2014.12)

(58) Field of Classification Search
CPC ............. H01Q 1/002; H01Q 1/28; H01P 1/08
See application file for complete search history.

(56) References Cited

U.S. PATENT DOCUMENTS

| | | | | |
|---|---|---|---|---|
| 4,986,068 A | * | 1/1991 | Lee .......................... | F23R 3/28 60/768 |
| 7,237,752 B1 | * | 7/2007 | Meyer ...................... | B64G 1/62 244/158.9 |
| 9,972,907 B2 | * | 5/2018 | Stratis ...................... | G01N 9/24 |

OTHER PUBLICATIONS

ATJ Graphite, GrafTech International, Anmoore, WV, USA, 2009.
Beck, D. Driver, M. Wright, and H. H. Hwang, "Development of the mars science laboratory heatshield thermal protection system," Journal of Space and Rockets, vol. 51, No. 4, Jul. 2014.
Caldelas, "Experimental Design of Electrophilic Gas Injection System for Plasma Blackout Mitigation during Hypersonic Reentry," MIT Department of Aeronautics and Astronautics, 2021.

(Continued)

*Primary Examiner* — Awat M Salih
(74) *Attorney, Agent, or Firm* — Barnes & Thornburg LLP

(57) ABSTRACT

A test article described herein enables ground-based arc jet testing to investigate RF blackout mitigation using electrophilic gas injection upstream of an antenna. The article can be scaled up to actual flight vehicles, thereby allowing reentry vehicles to be in constant, or near constant, communication during atmospheric reentry. Plasma blackout mitigation is an enabling technology that is required to advance hypersonic flight. Example articles include an integral structure that supports a nozzle, piping for gas connected to the nozzle and an RF window. An ablator can be attached to the structure. The ablator can include a graphite ablator and an insulator. A flight vehicle can include an antenna and such an article.

21 Claims, 15 Drawing Sheets

(56) References Cited

OTHER PUBLICATIONS

Carter, C. Martin, P. Withers, and M. Attallah, "The influence of the laser scan strategy on grain structure and cracking behaviour in sim powder-bed fabricated nickel superalloy," Journal of Alloys and Compounds, Jul. 2014.

Chen and F. Milos, "Multidimensional finite volume fully implicit ablation and thermal response code," Journal of Spacecraft and Rockets, vol. 55, No. 4, Aug. 2018.

Chen, F. Milos, D. Reda, and D. Stewart, "Graphite ablation and thermal response simulation under aro-jet flow conditions," AIAA Thermophysics Conference, Jun. 2003.

Danehy, J. Wilkes, G. Brauckmann, D. Alderfer, and S. Jones, "Visualization of a capsule entry vehicle reaction-control system (rcs) thruster," 44th AIAA Aerospace Sciences Meeting and Exhibit, Jan. 2006.

Diaz, S. Yoon, F. Panerai, and N. N. Mansour, "Simulation of hymets flowfield around baby-sprite entry probe," AIAA Aviation Forum, Jun. 2019.

Fahy, J. Langston, H. Wu, J. Koo, S. Kim, D. Misasi, R. Parra, L. Canan, and K. Li, "Silica-phenolic nanocomposite ablatives for thermal protection ap-plication," Journal of Spacecraft and Rockets, vol. 57, No. 3, May 2020.

Giangaspero, A. Lani, S. Poedts, J. Thoemel, and A. Munafo, "Radio communication blackout analysis of exomars re-entry mission using raytracing method," AIAA Scitech 2021 Forum, Jan. 2021.

Good and J. Rossi, "An injection system for alleviation of radio blackout during re-entry," Air Force Cambridge Research Laboratories Technical Report, Jan. 1966.

Hagedorn-Hansen, M. Bezuidenhout, D. Dimitrov, and G. Oosthuizen, "The effects of selective laser melting scan strategies on deviation of hybrid parts," South African Journal of Industrial Engineering, vol. 28, No. 3, Nov. 2017.

Hayes, E. Brown, and B. Kappes, "Characterization of selective laser melted grcop-84," AlAA Propulsion and Energy Forum, Jul. 2018.

High Temperature Ceramic Graphite Adhesives, Aremco, Valley Cottage, NY, USA, 2019.

INCONEL Alloy 625, Special Metals, 2013.

INCONEL Alloy 718, Special Metals, 2007.

Kaplan and E. Oran, "Quasi-neutrality in hypersonic ionizing reentry flows," AIAA SciTech Forum, Jan. 2021.

Kontinos and M. Stackpoole, "Post-flight analysis of the stardust sample re-turn capsule earth entry," 46th AIAA Aerospace Sciences Meeting and Exhibit, Jan. 2008.

Lin, L. Sproul, D. Hall, and J. Sontowski, "Reentry plasma effects on electro-magnetic wave propagation," 26th Plasmadynamics and Lasers Conference, Jun. 1995.

Lu and N. Fleck, "The thermal shock resistance of solids," Acta Materialia, vol. 16, No. 13, Aug. 1998.

McClinton, "The effect of injection angle on the interaction between sonic secondary jets and a supersonic free stream," NASA Technical Note, No. 32.

Morabito, "The spacecraft communications blackout problem encountered during passage or entry of planetary atmospheres," IPN Progress Report 42-150, Aug. 2002.

Morakis and W. H. Miller, "Bandwidth modulation techniques under study by nasa," IEEE Aerospace Applications Conference, Feb. 1996.

Peng and P. Doane, "Electron quench effects of sf6 in air and argon plasmas," AIAA Journal, vol. 8, No. 11, Nov. 1970.

Propagation. [Online]. Available: https://www.radartutorial.eu/03.linetheory/tl12.en.html.

Properties and Characteristics of Graphite, POCO-Entegris, Decatur, TX, USA, 2015.

Shui, P. Singh, B. Kivel, and E. Bresself, "Electron attachment at high tem-peratures," AIAA Journal, vol. 17, No. 11, Nov. 1979.

Sinha and G. Candler, "Grid sensitivity of detached eddy simulation of a mach 16 re-entry configuration," 45th AIAA Aerospace Sciences Meeting and Exhibit, Jan. 2007.

Spaid, E. Zukoski, and R. Rosen, "A study of secondary injection of gases info a supersonic flow," JPL Technical Report, No. 32. 1966.

* cited by examiner

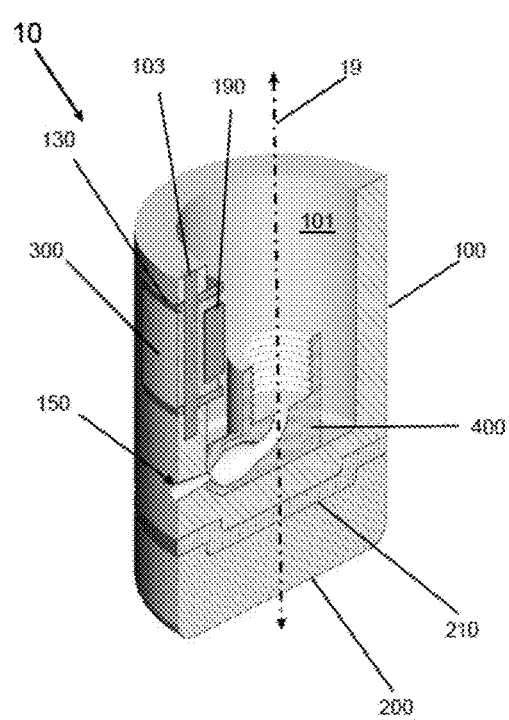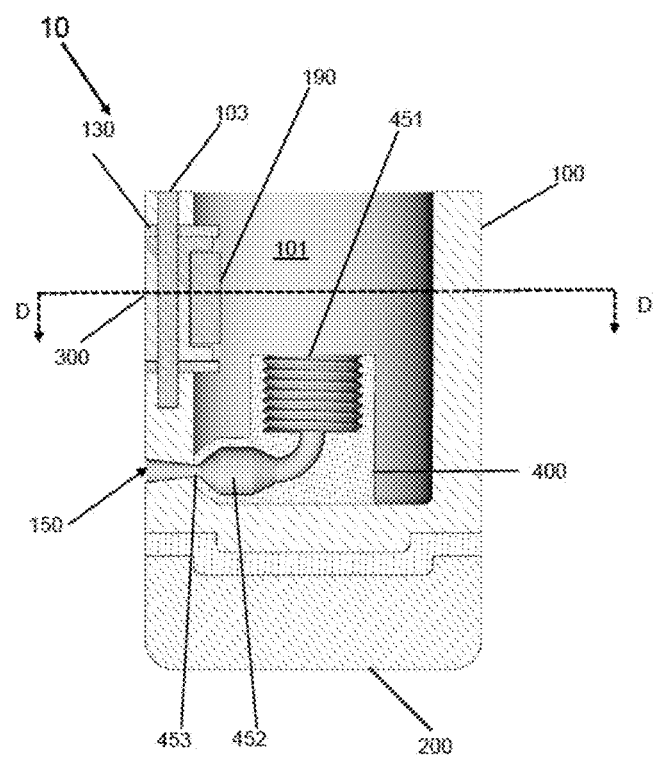
FIG. 1C
FIG. 1D

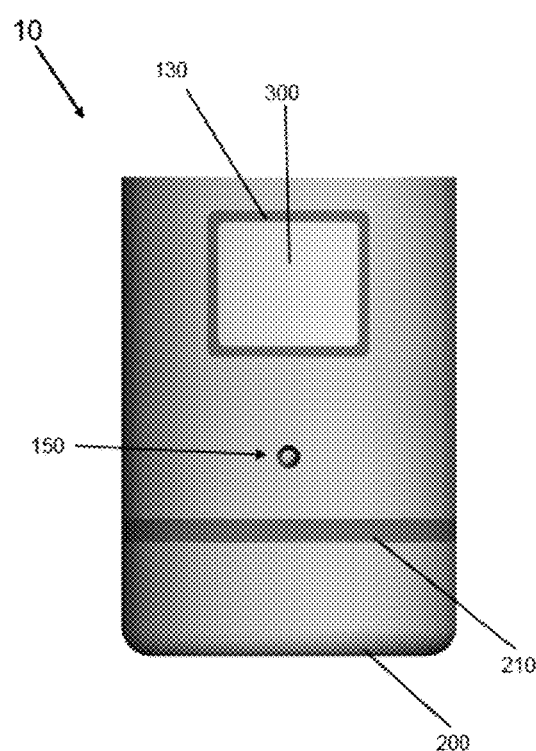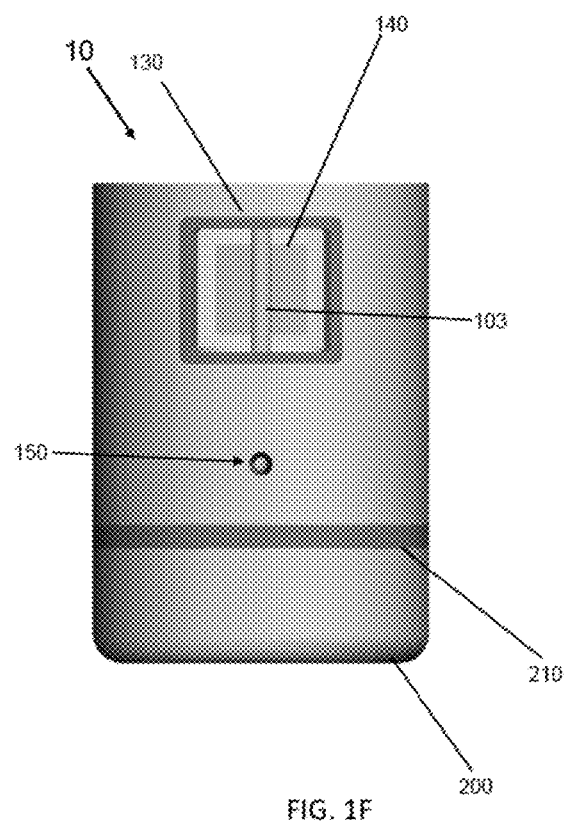
FIG. 1EFIG. 1F

GAS INJECTION SYSTEM FOR PLASMA BLACKOUT ALLEVIATION STUDIES

CROSS-REFERENCE TO RELATED APPLICATIONS

This application claims priority to and the benefit of U.S. Provisional Application Ser. No. 63/221,437, entitled "GAS INJECTION SYSTEM FOR PLASMA BLACKOUT ALLEVIATION STUDIES," and filed Jul. 13, 2021, the contents of which are incorporated by reference herein in their entirety.

FIELD

The present disclosure relates to devices and systems for mitigating radio frequency blackout during hypersonic travel, such as atmospheric reentry of a reusable space vehicle, and more particularly to systems and devices for studying the effects of plasma ion quenching using boundary layer gas injection to mitigate attenuation of external radio frequency communication.

BACKGROUND

Plasma blackout is a phenomenon experienced by hypersonic reentry vehicles whereby communication between the vehicle and ground/relay stations is blocked due to high electron number density. More specifically, radio communication blackout during reentry is an artifact of the sheer velocity of a hypersonic reentry vehicle. Reentry Mach numbers usually exceed 20. At these hypersonic Mach numbers, a plasma forms around the vehicle due to the localized extreme heating that occurs in the airflow adjacent to the windward surface of the vehicle. This high enthalpy flow encountered during reentry interacts with incoming and outgoing radio communications due to the free electrons present in the plasma that at least partially surrounds the vehicle. In many cases, these communications are blocked and the reentry vehicle cannot communicate with either a ground station or the satellites in orbit above (if present), hence the term blackout. Blackout is highly dependent on factors such as Mach number, altitude, pressure, and enthalpy, among others. However, for most maneuvering trajectory reentries such as those for Apollo, SpaceX Dragon, and upcoming Orion missions, blackout usually occurs approximately in the range of about 50 km to about 70 km above the Earth's surface for Earth reentry and can start as high as about 80 km for Martian reentry. The TDRS (Tracking and Data Relay Satellite) System and the Deep Space Network (DNS) are the staple for space-based communication around the Earth and Mars (and beyond) respectively. S-band communication between 2 GHZ to 4 GHz is the main communication band used during reentry phases of flight for vehicles using the TDRS System and the DNS. For these bands, blackout can last up to about six (6) minutes for Earth reentry and up to about 30 seconds for Martian reentry.

Plasma blackout is not confined to just atmospheric reentry. Any hypersonic vehicle flying in/through an atmosphere at a sufficient enough velocity to ionize the gas flowing around it will experience some degree of blackout. The signal frequency that is blocked by the plasma is set by the plasma frequency. Thus, when the plasma frequency appreciably exceeds the incoming/outgoing signal frequency, blackout has an almost certain probability of occurring.

The substantial amount of time that the vehicle is unable to communicate with ground or relay stations leaves it in a precarious situation. With no guidance information being relayed to the vehicle and no telemetry being relayed to mission control, the vehicle and its occupants (if applicable) must be able to function without assistance during the most challenging and dangerous aspect of the mission. With increased autonomous systems that carry private citizens with little to no flight experience, having constant or near-constant contact with a reentering spacecraft is required to ensure safety. As such, a method of mitigating or even eliminating plasma blackout has found new life after studies in the 1960s and 1970s lacked the computational power and flow diagnostic capabilities to adequately model and test systems in an integrated fashion. Proposals for blackout mitigation vary widely from changing transmission frequencies to changing the aerodynamic shape of vehicles during the reentry phase. It may prove helpful, however, to use the communication infrastructure that is already present, which means using existing transmission frequencies.

Accordingly, there is a need for improved systems and methods to mitigate and/or eliminate plasma blackout for vehicles in flight.

SUMMARY

Plasma blackout mitigation is an enabling technology that is required to advance hypersonic flight. One possible solution involves injecting sulfur hexafluoride into the flow adjacent to a radio antenna on a vehicle's exterior surface. Previous experiments show that sulfur hexafluoride ($SF_6$) is a viable gas to quench electrons. More specifically, $SF_6$ shows the highest efficacy for electron attachment with respect to mass flux. However, no previous work has shown the efficacy and viability of $SF_6$ gas to quench electrons on a capsule-like test article in a simulated reentry flow field in a ground test facility. Accordingly, a novel, first-of-its-kind electrophilic gas injection experimental apparatus is presented herein. Examples of the present disclosure include apparatus for conducting gas injection experiments to acquire testing validation of RF blackout mitigation techniques using gas injection of $SF_6$. Arc jet testing is difficult and multidisciplinary, and examples of the present disclosure include comprehensive consideration for the many factors that play a key role in test success. Herein, the fundamentals of plasma blackout and an overview of relevant physics and chemistry are presented to give a background to the problem and give insight into mitigation techniques. Of the various techniques, $SF_6$ gas injection is the primary example due to its known efficacy in quenching electrons and the lightweight and modular nature of such a system. A person skilled in the art, however, in view of the present disclosures will appreciate other gases that can be used in conjunction with the systems and methods provided for herein to mitigate and/or eliminate plasma blackout.

Examples of the articles disclosed herein enable ground-based arc jet testing to validate $SF_6$ injection angle and distance (e.g., the location of injection upstream of the antenna). Examples of the articles disclosed herein can be scaled up to actual flight vehicles, thereby allowing reentry vehicles to be in constant, or near constant, communication during atmospheric reentry.

Examples of the articles disclosed herein include articles that are configured to mitigate blackout of communication of a flight vehicle during reentry, and can include an integral structure that supports an exterior nozzle, piping for gas connected to the nozzle, and an RF window. An ablator can be attached to the structure, and the ablator can include a graphite ablator and an insulator. Examples of the articles disclosed herein can be used to inject an electrophilic can upstream of an antenna on a flight vehicle. Examples of the present disclosure also include flight vehicles having include an RF antenna and a gas injection nozzle according to examples of the test articles disclosed herein.

Examples of the articles disclosed herein are designed to survive a reentry-like flow field in an arc jet that is needed to simulate the expected use conditions. Example articles can be constructed using, by way of non-limiting example, 3D printed Inconel 625 as the structural component due to its high temperature performance and ability to integrate piping systems inside the structure itself. To protect the test article structure, a graphite ablator can be used due to its superior manufacturability, availability, and cost compared to other more exotic ablators.

Because an RF signal generation and transmission system is required to conduct a blackout experiment, an RF antenna can be used to produce a 2.4 GHz signal whereby $SF_6$ efficacy can be verified. Examples include the use of a novel ceramic manufacturing technique to construct an RF window that can survive the high temperatures required for such a test.

Plasma Physics of Radio Blackout Mitigation

Plasma blackout (also referred to herein as radio blackout) is driven by the fact that plasma is, by definition, an ionized gas with ions and free electrons. It is well understood that for the majority of a space vehicle reentry profile, the plasma remains quasi-neutral. That is, the positively charged ions and negatively charged electrons are neutralized throughout the plasma as a whole. Since the plasma is known to be quasi-neutral, various fundamental principles for plasmas can be applied for reentry flows. The most critical of these is the relation between plasma frequency and electron number density. The plasma frequency determines which incoming communication frequencies will be blocked during the blackout period. In its most basic form, the following holds: Plasma blackout occurs when electrons in plasma have enough time to adapt to externally applied electric field and shield spacecraft, and radio signal penetration occurs when electrons in plasma do not have enough time to adapt to externally applied electric field and radio signal can penetrate plasma. Using a spacecraft reentry vehicle as a classic example, the relevant hypersonic flow field can be broken down into three critical areas:

Forebody: Region immediately behind the bow shock, usually blunt for a capsule, which is protected using an ablator. This area sees the highest temperatures and pressures as the flow stagnates at the capsule centerline.

Aftbody: Region located behind shoulder of the capsule where the flow cools as it expands. Many times, the separation point can be located on the aftbody, creating a large shear layer.

Wake: Region after the capsule, which is usually subsonic. As a result, temperatures in the wake can be on the same order of magnitude as that in the forebody region.

For a plasma, electron number density correlates roughly with temperature. As such, the highest number densities are expected to be in the regions of highest temperatures. As alluded to above, this corresponds to the forebody and wake regions. The wake region sees a high temperature as a result of its low Mach number. As the flow passes from the aftbody into the wake, the airflow transforms translational kinetic energy into thermal energy, as it is forced to slow to lower velocities. This increase in thermal energy is manifested in an increase in temperature. Accordingly, electron density is not uniform throughout the flow field during hypersonic travel. As a result, plasma blackout is as much a function of electron number density as it is of antenna placement. The Space Shuttle, for instance, did not have communication blackout as a result of its aerodynamic shape. Unlike a capsule, the Space Shuttle's wake had a low enough electron number density such that an antenna looking upwards into space during reentry (instead of downwards towards Earth) could establish a communication link with the Tracking and Data Relay Satellite (TDRS) System that would then relay communication down to Earth.

An arguably critical aspect of this concept for the present example is the fact that one objective is to enable the efficacy of $SF_6$ is to be evaluated in simulated reentry and hypersonic flow conditions. Therefore, the entire flow field surrounding examples of the test article must be high enough to block incoming and outgoing communications. Else, the signal could essentially find the path of least number density (i.e., path of least resistance) and leak out. This would give confounding results, as a baseline flow would already have some signal acquisition, albeit at larger attenuation values but still acquisition.

Because one purpose of the experiments using examples of the present disclosure is to show an initial full blackout and then signal acquisition after gas injection, the article must produce a flow field where the entire plasma surrounding the article has a refractive index close to, if not equal to, zero. This corresponds to the entire flow field around the test article have a number density that exceeds the critical number density for the test signal frequency. As such, the test article can resemble a capsule geometry so as to establish flow fields that are capable of producing a large electron number densities (with corresponding temperatures of greater than about 3000 K) similar to those seen for actual reentry vehicles.

Electrophilic Gas Injection

Various electrophilic gases have been suggested in literature that can be used to quench electrons in a reentry flow. Sulfur hexafluoride ($SF_6$) has shown the highest efficacy for electron attachment with respect to mass flux. The formation of stable negative ions is the typical end goal for any electrophilic gas injection system. By attaching an electron to an ion, the number density of free electrons in the plasma is reduced, thereby decreasing the plasma frequency. Electron attachment can be achieved via a dissociative attachment reaction that is predominant in regions of about 3500 K or less—above this temperature limit, $SF_6$ dissociates into its constituents. From a jet penetration perspective, $SF_6$ injection can be considered a supersonic jet in crossflow, with an important parameter being the location of the injection with respect to the flow around the test article.

Examples of the present disclosure can be configured to inject $SF_6$ into a flow region of about 3500 K or less to properly reduce the number of free electrons. Thus, $SF_6$ likely cannot be injected at a stagnation point (e.g., in the forebody flow) and achieve RF blackout mitigation, but rather in a cooler region of the flow field. This constraint influenced the test article design. Example test articles can help to create a region of high temperature, high electron production, but also induce expansion of the flow such that the temperature drops below about 3500 K to be able to inject $SF_6$. This flow field created by examples of the test article can be designed to be similar to the flow field seen in the representative space capsule example discussed above, where a large amount of electrons are produced due to the strong interaction between the blunt forebody and the airflow. After this initial interaction, the flow then expands as it moves over the shoulder and around the aftbody, cooling significantly. Even though the flow cools as it expands over the shoulder, a large amount of electrons produced in the stagnation region can still be present at least because, in the stagnation region, the flow has a high temperature and low Mach number. Thus, this aftbody flow region can be thought of, to first order, as being in equilibrium. In the expanded region, downstream of the aftbody, the flow is cold and fast in that it is low temperature (compared to the stagnation region) and high Mach number. Thus, it can be thought of being more of a frozen flow. Therefore, the electrons do not have time recombine as the flow expands over the shoulder because it is a frozen flow regime whereby chemical reaction rates are significantly reduced. Put another way, the electron densities immediately after the shoulder will still be large at least because the recombination rates are slower than the expansion rates. Accordingly, the example test article designs disclosed herein can be configured to simulate a reentry capsule configuration with an injection after the shoulder on the aftbody surface. This arrangement can also enable the creation of an expanded flow region whereby $SF_6$ can be injected so that it does not dissociate.

An injection mass flow requirement is driven by both electron quenching and jet penetration criteria. In general, there must be a sufficient quantity of $SF_6$ to quench the highest number densities in the flow, such that $SF_6$ concentration can be greater than or equal to the concentration of electrons in the flow.

Test Article Design Overview

Gas injection piping is part of the test article design. Sealing surfaces in hypersonic vehicles is an extremely difficult task and still an active area of research. Therefore, aspects of the present disclosure include articles with a piping system integrated into the structure of the test article itself. Brazing is a possibility, but the bond integrity at high temperatures is questionable with currently available techniques. Existing hypersonic test articles have used interchangeable piping systems, but these were designed for use in shock tube facilities with short run times (e.g., order of milliseconds) and low surface temperatures. This is a significant reason why existing articles were constructed out of aluminum alloys, which do not have an appreciably high melting temperature. Examples also include machining of an inner piping, however, due to some of the examples herein being configured to work with small test article size requirements and piping orientation requirements, traditional subtractive machining can be prohibitively difficult and expensive.

Accordingly, examples of the present disclosure include test articles constructed at least partially using 3D printing (sometimes referred to as "additive manufacturing") to integrate piping into the structure of the test article, without the need for bolts, sleeving, or brazing. At least because the base structural material used for the test articles must be able to retain its strength at elevated temperatures, one advantageous option is 3D printing of Inconel superalloys using, for example, direct metal laser sintering (DMLS), also sometimes referred to as direct metal laser melting (DMLM) technology. These technologies have matured since their conception 20 years ago to the point where their use in high temperature conditions is viable. DMLS printing functions by distributing a powder of the metal of choice on a build plate at a uniform thickness. A laser can then melt the powder locally and can "weld" the top layer of melted powder to the previous layer. A new layer of uniform powder thickness can then be deposited and the process can repeat itself. The use of this additive manufacturing technology allows for intricate channels and complex geometries to be made that would be impractical (or even impossible) using subtractive manufacturing methods. DMLS is an enabling technology to manufacture these test articles with the piping already integrated into the structure.

There are a variety of different Inconel 3D printed powders available. However, the most common commercially available powders with substantial publically released industry and research literature are Inconel 718 (IN718) and Inconel 625 (IN625). Both have the highest melting temperatures of any commercially available metal powders. The maximum service temperature, defined as the temperature at which the material can be used for prolonged periods without substantial loss of performance, is a driving factor for arc jet testing. All things being equal, a higher maximum service temperature is typically desired as it allows for expansion of the arc jet testing envelope in which the test article can survive.

Both IN718 and IN625 retain their high yield strengths at high temperatures. IN718 is stronger than IN625, though it also has a lower maximum service temperature. Examples of the present disclosure can be 3D printed out of either material, though there can be advantages to using IN625, due, at least in part, to how the powders themselves are manufactured. IN718 derives its strength by being precipitated hardened. IN625, on the other hand, has a higher concentration of molybdenum and precipitation hardening is not required for IN625. IN625 has a higher maximum service temperature than IN718 at least because, with IN718, the precipitates are introduced into the metal matrix starting at about 866 K and they will start to solutionize out of the matrix if the metal is heated up to that temperature during service. This "solutionization-out" effect can result in the maximum temperature of IN718 to be approximately in the range of about 866 K to about 922 K (depending, at least in part, on the initial precipitation hardening temperature), beyond which the microstructure of IN718 will typically become unstable. Because IN625 is not precipitation hardened, it does not have this effect and therefore can have a higher maximum service temperature, approximately in the range of about 1144 K to about 1255 K.

IN625 also has superior corrosion and oxidation resistance to IN718 due, at least in part, to its higher percentage of chromium and aluminum. Therefore, IN625 is typically more suited for a reusable test article. Arc jet testing typically occurs in air (i.e., 76% $N_2$, 23% $O_2$), therefore, oxidation resistance is desired because the test article should retain its structural integrity throughout multiple runs. Note that this discussion pertains to the manufacturing of the powders themselves. Precipitates can be introduced during the 3D printing process, but the underlying effects described above can be the ones that set the material properties in this context.

Examples of the present disclosure also include test articles 3D printed using a 3D printing technique that includes an interlayer laser scanning pattern. Example of the present disclosure also include test articles 3D printed with no heat treatment.

Ablator Design

Examples of the present disclosure can include an ablator to allow the test article to survive the desired test duration in arc jet facilities. Though examples of the present disclosure include the use of exotic and state-of-the-art ablators, they can be prohibitively expensive and difficult to obtain. Accordingly, examples also include the use of ablators that are established in literature to perform well, are easy to procure, and/or are relatively inexpensive, such as graphite.

Because the focus of the test is not the ablator itself, but gas injection, the ablator is present to protect the test article and add to the simulation of a real-world reentry flow field. Thus, an ablator, such as graphite, that is known to perform well is advantageous. Additionally, the choice of ablator can modify the flow field to a non-negligible extent. Therefore, to add to the demonstration of $SF_6$ efficacy, an ablator that is used in real-world reentry applications can be used over other materials that either do not ablate or behave differently than what is seen on typical reentry capsules.

Examples of the present disclosure can include ablators that can be reused or replaced in an inexpensive and straightforward manner, and that enable the test article to be refurbishable (or even reusable) after a run. Additionally, the ability to dual-pulse the ablator (e.g., two consecutive runs without replacement) is also advantageous. This ability means that, in some examples, the ablator does not need to be replaced after each run at least because its thermomechanical properties can allow it to perform nearly the same on the second run as it did on the first. Under these considerations, the rationale and methodology for the selection of graphite as an ablator follows, in brief.

First, it can be advantageous to have an ablator that can handle high shear loads, such as those seen at certain test facilities. Second, some ablators, such as Phenolic Impregnated Carbon Ablator (PICA), can char and cause a layer of charred material (e.g., pure carbon) to form on the surface of materials during ablation. Dual-pulsing PICA can become a complicated issue as this char layer can change the effective properties of the material.

A fully dense carbon phenolic or graphite ablator can eliminate the concern for failure mechanisms related to shear and charring. Fully dense carbon ablators are more difficult to procure than graphite; graphite is cheaper, easier to manufacture, and easier to obtain. Two examples of common grades of graphite that are readily available and relatively low in cost are ATJ Graphite (high grade isopressed) and POCO/Entegris AXF 5Q (premium isopressed graphite).

Another ablator material property of significance is thermal shock resistance. The test article during arc jet testing can undergo thermal shock as it sits outside of the flow during arc jet startup and is then swung in fractions of a second. Thus, examples of the present disclosure can include ablators that have a high thermal shock resistance to be able to resist cracking. ATJ graphite is generally superior in thermal shock resistance to POCO due, at least in part, to the ratio of thermal conductivity, Young's Modulus, and yield strength.

The selection of graphite comes with a unique challenge. Because ablators such as PICA are low density by design to minimize weight, they typically have an open porous structure that results in their thermal conductivity being orders of magnitude lower than that of ablators made using fully dense carbon or graphite. Though graphite is easily procurable, easily manufacturable, and inexpensive, the largest downside is its high thermal conductivity. However, thermal conductivity being highest at lower temperatures allows for faster heat transfer through the material at the very beginning of the run. Therefore, examples of the present disclosure are configured to contain the high heat transfer at the beginning of a test to prevent the downstream Inconel structure from being exposed to high temperatures very quickly. Examples of the present disclosure include the use of an insulator material with very low thermal conductivity and can survive at high temperatures, which is advantageous. Examples include this insulator positioned between the ablator and Inconel body. Examples also include the use of a thermal insulation blanket, such as a 1600 Saffil thermal insulation blanket manufactured by Unifrax, positioned between the graphite and Inconel.

Further examples include the use of a high temperature adhesive to mechanically attach the ablator to the underlying Inconel structure. Room temperature volcaniation (RTV) adhesives such as RTV-560 and RTV-577 can be used in arc jet testing, though they have virtually no high temperature performance—their maximum operating temperature is typically below about 530 K. Therefore, there is a relatively low bondline temperature constraint in configurations that use these adhesives, causing the ablator to be thicker to reduce the maximum bondline temperature seen during tests.

Because the use of graphite leads to high heat transfer, and thus higher temperatures in the ablator for the same arc jet residence time, examples of the present disclosure include the use of high temperature ceramic adhesives, which allow for bondline temperature limits to increase to almost 2000 K. However, their absolute bond strength is not particularly high and, because the test article can be swung in and out of the flow in arc jet tests (e.g., inducing a shear on the ablator), graphite ablators secured with high temperature ceramic adhesives can shear off as the article is rotated out of the flow. Examples of the present disclosure include an ablator coupling design using tooth-like fixtures on the outside of the ablator to prevent separation due to shear forces. Examples of these toothed ablator couplings can still use Saffil placed between the graphite and Inconel at the teeth interfaces. The teeth can be placed on the outside surface to prevent interference with the constrained interior volume used for gas injection piping.

Rf Window and Antenna Design

Blackout mitigation studies can include the use of a signal generation, transmission, and reception system to assess the ability of $SF_6$ to quench electrons in the prescribed flow regime. An RF signal cannot penetrate any appreciable amount through an Inconel structure. As such, examples of the present disclosure include an RF window configured to allow a radio signal to be sent from the test article in the flow to receivers located outside (e.g., on the side of a tunnel in which the test article is exposed to the hypersonic flow).

RF window sealing is a challenging aspect of hypersonic flight and an active area of research. The predominant RF signal band used for the TDRS System and the DNS is S-band between 2 GHz and 4 GHz. Examples of the present disclosure include a radio transmitter antenna configured to operate in this regime (e.g., emitting a 2.4 GHz because it is a commonly transmission device due to its use in WiFi). Examples of the present disclose include SMD ceramic patch antennas, which can have, for example, maximum operating temperatures of less than about 400 K. Therefore, the antenna cannot be mounted directly on the surface of the test article at least because it would melt almost immediately. Accordingly, examples include the use of an RF window that protects the antenna from the high flow field temperatures.

Because RF windows can be waveguides, RF propagation can be used to guide the window design, with dimensions ascribed according to the properties of the material window and the desired transmission frequency. Moreover, the window can be manufactured such that the cutoff frequencies for the desired and undesired electromagnetic modes are fulfilled.

RF communication is accomplished via electromagnetic waves that can propagate along waveguides using many different modes. Relevant modes include the TE (transverse electric) and TM (transverse magnetic) electromagnetic propagation modes. In windows made of monolithic materials, TEM (transverse electromagnetic) modes cannot exist at least because the waveguide is of a single conductor. Each one of these modes is given a specific number, with the dominant mode in a waveguide having the lowest cutoff frequency. In the case of a rectangular waveguide, this corresponds to the TE10 mode. If the transmission frequency for a given waveguide width is above the cutoff frequency for both the TE10 and TE20 modes, for instance, both modes will be present in the waveguide. This causes the modes to interact and high signal attenuation to occur. Examples of the present disclosure include the width of the antenna being not large enough to allow for the full sinusoid of the TE20 to form. Examples include the TE10 mode being desired, in which the maximum width of the antenna can be set, at least in part, by the cutoff frequency of the TE20 mode.

Examples of the present disclosure include test articles with RF windows manufactured with a novel technique, described herein. Due to its first-of-its-kind nature, the window was manufactured first and the dielectric properties measured to determine what the cutoff frequencies are.

There are only a select few RF window materials that can survive high temperatures and still have desired electromagnetic wave propagation properties at elevated temperatures (e.g., those experienced at the surface of a test article in hypersonic flow). Though these materials are typically hard to machine, examples of the present disclosure include curvatures of relatively high precision on the window material to keep height mismatch between the Inconel and antenna surface to a minimum. Examples of the present disclosure include RF windows created using an injection molding techniques for Silicon Nitride ($Si_3N_4$) for this very purpose. Tooling can be created similar to that of plastic injection molding to produce a "green part" that can be machined to tighter tolerances as required. Examples of the present disclosure includes the production of a near net (and even net depending on configuration) part made out of $Si_3N_4$. As such, machining the near net part, sometimes called "green machining," can be easier than machining the part from stock. Examples of the present disclosure include sintering the green part to close pores in the material due to the injection molding process. Examples of the present disclosure include RF windows produced as an injection molded and sintered piece of $Si_3N_4$.

Examples of the present disclosure include one or more press fit pins driven through the window (e.g., from the top of the test article and into a circular slot on the forward side). The pins can be made of the same material as the RF window (e.g., $Si_3N_4$) or another suitable material. These pins can serve as a secondary retention device should the adhesive fail. At least because the pins can be the same material as the window, the window should, theoretically, behave in the same manner as if it were a monolithic material. The fact that they pins are press fit is advantageous, at least because introducing glue into the holes in the window of the antenna would invalidate the assumption that the window will behave as a monolithic material.

The use of pins can modify the production process. If the RF window is sintered post injection molding, any holes drilled in the green part during green machining would typically close-up as the part contracts during the sintering process. This would require post sintering machining to make the holes the correct size for the pins. To combat this, examples can include the injection molded green part having no holes, with the pin holes added post sintering to avoid cracking. Additionally, the drilling of holes in the post-sintered part can be non-trivial, and can require great care to not damage the window.

RF window sealing is an active area of research in hypersonics. Examples of the present disclosure include the use of dissimilar redundant attachment techniques to ensure that the RF window stays attached to the Inconel structure of the article. Because there is a mismatch between the coefficient of thermal expansion of Inconel and the $Si_3N_4$ window, examples include the use of a tapered configuration that are configured to distribute strain loads in the vertical and horizontal directions. Additionally, a tapered side-profile can assist in keeping the RF window attached to the structure of the article (e.g., the Inconel) due, at least in part, to the pressure of the flow outside being greater than or equal to the pressure inside the test article. That is, the pressure pushes the antenna inwards in the direction of the taper, holding the RF window in place.

Examples also include the use of a gasket material placed between the Inconel and RF window to prevent gas from flowing between the interfaces. Examples include the use of thermal insulation, such as that can used on the ablator (e.g., Saffil), as both uses benefit from an ability to be compressed to fill grooves and voids in the material. Examples also include the use of a ceramic adhesive, such as the same adhesive used for the ablator (e.g., Ceramabond 671) used to bond the window to the Inconel. Advantageously, using the same adhesive means the entire test article can be cured all at the same time, thereby decreasing complexity and risk in curing one adhesive in one manner and another in a different one.

One example of the present disclosure is a test article for mitigating RF blackout in a hypersonic flow using electrophilic gas injection. The test article includes a body, an ablator, an RF window, and a connector. The body has a forward end and aft end, and further, it defines an exterior surface that is configured to be exposed to hypersonic flow. Further, the exterior surface has a nozzle integrally formed as part of it. The ablator is coupled to the forward end of the body, while the RF window is disposed in a recess in the exterior surface of the body. The ablator is configured to be directly exposed to the hypersonic flow and direct the flow around the body, while the RF window defines an exterior surface coextensive with the exterior surface of the body. The connector secures the RF window to the body and can be, for example, at least one dowel pin that extends through the RF window and from a first opening in a first side of the recess to a second opening in a second opposite side of the recess. The nozzle is located upstream of the RF window with respect to a direction of the hypersonic flow after being deflected by the ablator.

The nozzle can be circular and/or conic, or the nozzle can have another shape, such as a rectangular/triangular/star shaped exit nozzle, among other options. The RF window can be made from silicon nitride. The RF window can be a monolithic structure of silicon nitride. The RF window can be formed by injection molding and/or sintering, including when the window is made of silicon nitride and/or is a monolithic structure. In at least some embodiments, the RF window and the connector can be constructed from the same material. The RF window can include a first lateral side and a second opposite lateral side that together define an inward taper. In some such embodiments, the first side of the recess and the second opposite side of the recess can define a corresponding inward taper such that the RF is constrained from moving further into the recess by a geometric interference between the first and second lateral sides of the RF window and the first and second sides of the recess.

The test article can include a thermal insulation surrounding a periphery of RF window between the RF window and the body, with the connector extending through a first opening in the thermal insulation adjacent to the first side of the recess and through a second opening in the thermal insulation adjacent to the second side of the recess. The test article can includes a high-temperature thermal insulation disposed between an aft end of the ablator and the forward end of the body. The ablator can be rotationally fixed to the forward end of the body with a set of interlocking teeth, which can be as few as one or two teeth with no upper limit on the number possible. In some embodiments, the ablator can include graphite.

The body can be tubular, and the connector can extend through the body and RF window substantially parallel to a central axis of the body. The body can be monolithic. The body can be made of Inconel 625. The body can define an interior cavity, with the body including a coupling within the interior cavity, and the coupling being configured to receive a supply of fluid. The body can also include a fluid passageway connecting the interior coupling with the nozzle. In at least some embodiments, the fluid passageway can be at least partially formed by 3D printing the body to include the fluid passageway. The nozzle can be configured to inject sulfur hexafluoride into the hypersonic flow such that the sulfur hexafluoride quenches ions in a region of the hypersonic flow adjacent to and/or above the RF window.

Another example of the present disclosure is a method of mitigating blackout of communication of a flight vehicle during reentry or hypersonic flight. The method includes injecting an electrophilic gas from an exterior nozzle of the flight vehicle and transmitting a radio signal from an antenna located behind an RF window on the exterior of the flight vehicle. The action of injecting transports the electrophilic gas into a region of plasma generated by the interaction between an exterior of the flight vehicle and a hypersonic airflow, with the region of plasma being located adjacent to and/or above the RF window on the exterior of the flight vehicle. The transmitted radio signal penetrates the region of plasma due to ion quenching by the electrophilic gas in the region of plasma.

In conjunction with the method, the RF window can be disposed in a recess in the exterior surface located downstream of the exterior nozzle with respect to the region of plasma, with an exterior surface of the RF window being coextensive with the exterior surface of the vehicle. Further, the RF window can be coupled to the flight vehicle with a connector, for example, at least one dowel pin that extends through the RF window and into the flight vehicle at opposites sides of the RF window. The connector can be made from the same material as the RF window. Further, the RF window can include a first lateral side and a second opposite lateral side that together define an inward taper, and the recess in the exterior surface of the flight vehicle can define first and second opposite sides with a corresponding inward taper such that the RF window is constrained from moving further into the recess by a geometric interference between the first and second lateral sides of the RF window and the first and second sides of the recess. The RF window can be monolithic structure of silicon nitride and can be formed by, for example, injection molding and sintering.

Yet another example of the present disclosure is an RF blackout mitigation system for use in a flight vehicle, the system including an electrophilic gas injection system with an injection nozzle formed in an exterior surface of the flight vehicle, a source of an electrophilic gas, a controller, an RF window, and a connector, such as at least one dowel pin. The nozzle is at a location downstream of a stagnation region during hypersonic travel. The controller is configured to control flow of the electrophilic gas through the injection nozzle. The RF window is disposed in a recess of the exterior surface of the flight vehicle and defines an exterior surface coextensive with the exterior surface of the body. The connector extends through the RF window and from a first opening in a first side of the recess to a second opening in a second opposite side of the recess. The controller can include a mechanical controller, such as a valve, an electromechanical device, and/or a computer or other electronic programmable logic system that operates a mechanical device to control flow of the gas to the nozzle.

The RF window can include a first lateral side and a second opposite lateral side that together define an inward taper, and the recess in the exterior surface of the flight vehicle can define first and second opposite sides with a corresponding inward taper such that the RF window is constrained from moving further into the recess by a geometric interference between the first and second lateral sides of the RF window and the first and second sides of the recess. The RF window can be a monolithic structure of silicon nitride that can be, for example, formed by injection molding and/or sintering. The connector can be made from the same material as the RF window. The electrophilic gas can be sulfur hexafluoride.

The following Detailed Description references the accompanying drawings which form a part this application, and which show, by way of illustration, specific example implementations. Other implementations may be made without departing from the scope of the disclosure. Furthermore, the descriptions in the Summary section above also constitutes aspects of the disclosure akin to what is provided for in the Detailed Description, and should not be given any less weight or consideration because they are in the Summary section rather than the Detailed Description section.

BRIEF DESCRIPTION OF DRAWINGS

This disclosure will be more fully understood from the following detailed description taken in conjunction with the accompanying drawings, in which:

FIG. 1C is isometric cross-sectional view of the test article of FIG. 1A taken through plane A-A illustrated in FIG. 1B;

FIG. 1D is a side cross-sectional view of the test article of FIG. 1A taken through plane A-A illustrated in FIG. 1B;

FIG. 1E is a side view of the test article of FIG. 1A;

FIG. 1F is a side view of the test article of FIG. 1A with a translucent RF window;

DETAILED DESCRIPTION

Figures 1A, 1B:
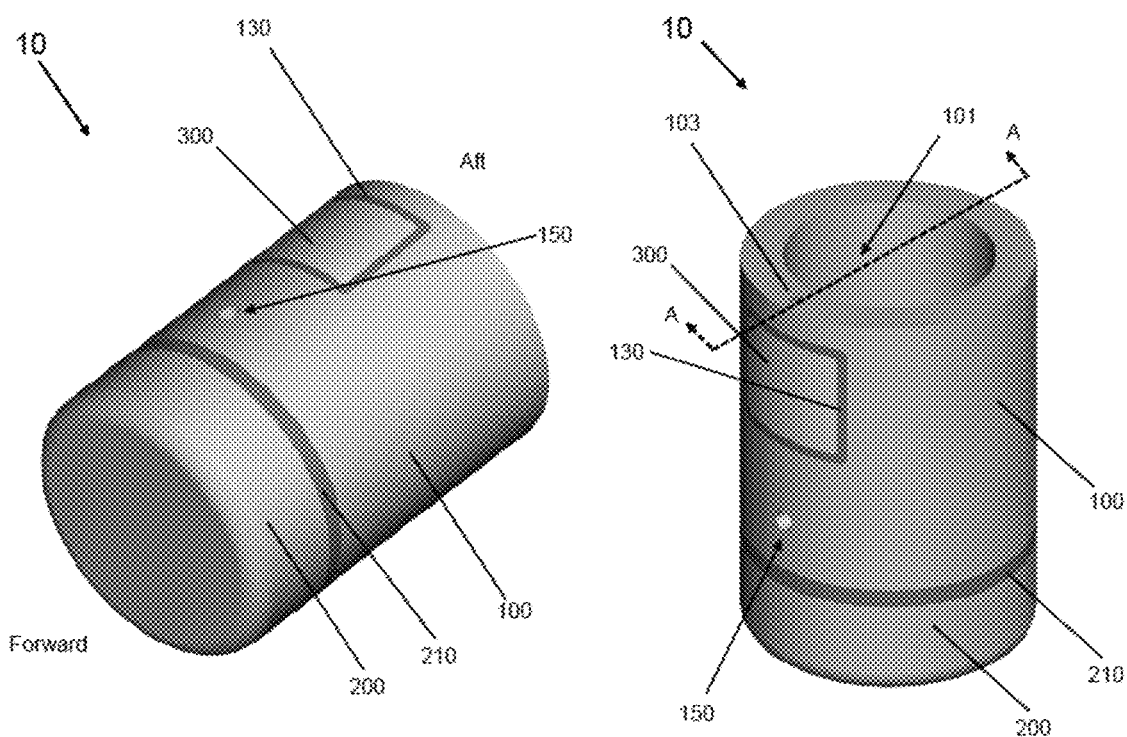
FIGS. 1A and 1B are isometric views of an example test article for studying radio frequency blackout mitigation in a hypersonic flow using electrophilic gas injection.

Certain exemplary embodiments will now be described to provide an overall understanding of the principles of the structure, function, and use of the devices, systems, and methods disclosed herein. One or more examples of these embodiments are illustrated in the accompanying drawings. Those skilled in the art will understand that the devices, systems, components related to or otherwise part of such devices, systems, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, and components related to each of the same, provided for herein.

To the extent the present disclosure includes various terms for components and/or processes of the disclosed devices, systems, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes test apparatuses for conducting validation studies of RF blackout mitigation techniques, alternatively, or additionally, examples include reusable space vehicles and/or hypersonic vehicles that include an RF window, RF antenna, and an electrophilic gas injection system according to the arrangement disclosed herein. In the present disclosure, like-numbered and like-lettered components of various embodiments generally have similar features when those components are of a similar nature and/or serve a similar purpose.

The present disclosure is related to test articles for the implementation and study of RF blackout mitigation using an $SF_6$ gas injection system. However, alternative configuration are disclosed as well, such as the injection or one or more alternative electrophilic gases or liquid. Accordingly, one skilled in the art will appreciate that the devices and systems presented herein are not limited to configurations based on $SF_6$ gas injection systems and/or the particular geometric constraints of the test systems in which examples were sized to operate, but are broadly capable of studying and validating the use of electrophilic gases or liquid injection in real-world applications outside of a test environment. Indeed there may, for example, be reusable space vehicles and/or hypersonic vehicles that can directly integrate aspects of the RF window, RF antenna, and gas injection systems disclosed herein to mitigate RF blackout during use.

FIGS. 1A-6 show example test articles for use in small-scale hypersonic test facilities, such as the Hypersonic Materials Environmental Test System (HyMETS) arc-jet facility at NASA Langley Research Center. Test article geometry for use in the HyMETS apparatus is highly constrained by the limitations of the facility. Numerical simulations for test articles used at HyMETS show there is a 1.75 inch diameter limit. Additionally, the sting distance behind nozzle exit is fixed. Therefore, the length of the test article cannot exceed 2.5 inches. Also, because internal piping is required, the test article should be as large as possible to allow for this piping to fit inside with all associated connections. The larger the test article, the more space there is inside to integrate an antenna. Thus, a cylindrical geometry fills the test article dimensional envelope in HyMETS. Example test article dimensions are 1.75 inches outer diameter, 1.178 inches inner diameter, and 2.5 inches long. The ID can be larger than the sting adapter diameter to allow for thermal insulation to thermally isolate the sting from the test article. While FIGS. 1-6 show test articles sized within these constraints of the HyMETS facility, those skilled in the art will appreciate that these dimensions are not limiting of test articles used in other facilities, and the specific features and arrangements of features of the example test articles illustrated and discussed herein are well-suited for use in other test facilities, including those of a larger size, irrespective of the gross size of the test article itself.

Figure 7:
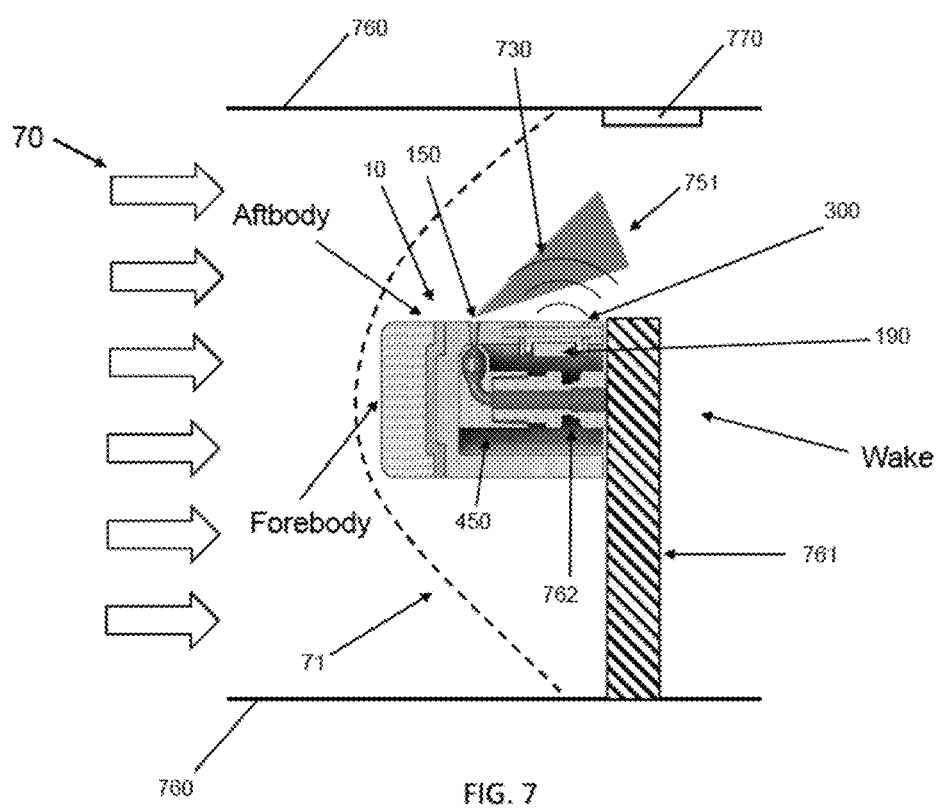
FIG. 7 is a schematic illustration of a hypersonic test being conducted with a test article according to examples of the present disclosure.
Figure 8:
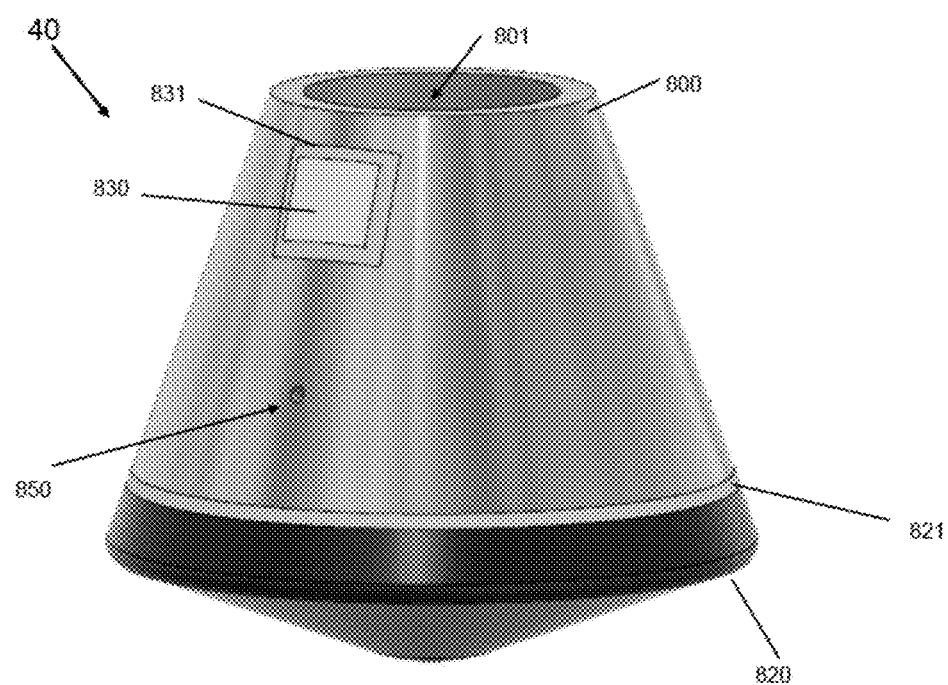
FIG. 8 is an isometric view of an example test article shaped as a reentry vehicle.

FIG. 7 shows a schematic illustration of an arc-jet hypersonic test conducted with an example of the present disclosure and shows the use of electrophilic gas injection to mitigate RF blackout. FIG. 8 is an example test article for use in large-scale hypersonic test facilities, such as the H2 Arc Heater at the Arnold Engineering Development Complex (AEDC). Specifically, FIG. 8 shows a test article with an exterior shape based off a reentry capsule and is sized to operate within the AEDC test facility. Because the AEDC facility is a large facility, the test article of FIG. 8 is less restricted in terms of dimensions. Accordingly, the test article of FIG. 8 is an example of how sizing up the test article does not change the specific RF blackout mitigation features and arrangements of those features. In FIG. 8, the forebody and shoulder regions of the rest article are proportionally scaled such that the diameter test article is 5 inches (instead of 31.93 inches for the full-scale capsule on which this article is based). The aftbody is slightly modified such that it is 20 degrees from the vertical instead of 30 degrees, as seen on capsules designed for reentry condition (e.g., Mach 20 and above). This change move the separation point aftward at least because the test article in the AEDC facility operates at Mach 4.5. This decreased angle increases the length of the aftbody and allows for a larger distance from the injection point to the midpoint of the RF window. A longer distance will allow for the electrophilic gas (e.g., $SF_6$) to have more time to quench the electrons before arriving above the antenna. Accordingly, those skilled in the art will appreciate that the distance between the injection nozzle and the RF window can be dependent on both the operating flight velocities, as well as the shape of the vehicle. Examples of the present disclosure enable the introduction of the electrophilic gas upstream of the RF window such that the electrophilic gas is able to quench the ions in a region of plasma adjacent to and/or above the RF window, thereby facilitating RF blackout mitigation by reducing the attenuation the RF signals emits through the RF window.

Figure 9:
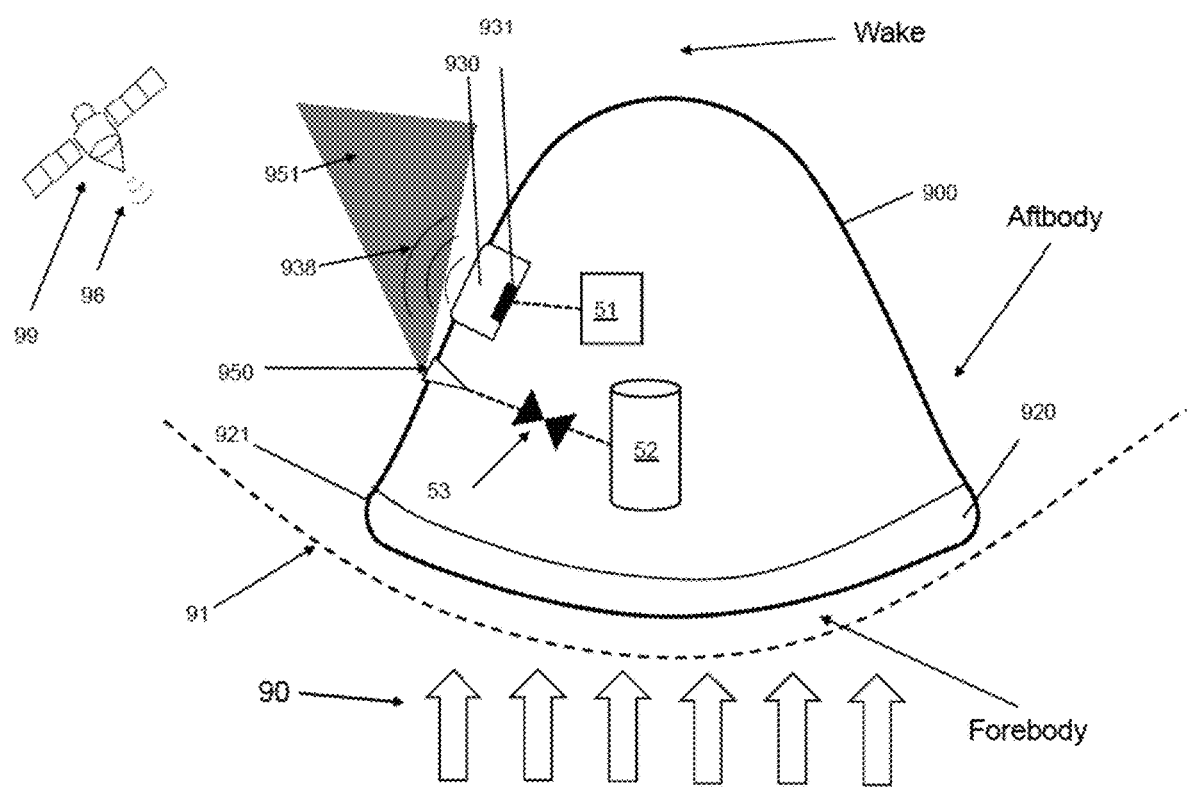
FIG. 9 is a schematic illustration of a space flight vehicle with an RF black mitigation system according to aspects of the present disclosure.

Finally, FIG. 9 is an example RF blackout mitigation system in use on a spaceflight vehicle during reentry.

FIGS. 1A and 1B are isometric views of an example test article 10 for studying radio frequency blackout mitigation in a hypersonic flow using electrophilic gas injection. The test article 10 includes a generally cylindrical and tubular body 100 (e.g., an Inconel 625 3D printed structure) with an interior cavity 101 that is open at the aft end of the test article 100. The body and interior cavity 101 define a central longitudinal axis 19. The body 100 has an exterior surface with a nozzle 150 formed therein that is sized and shaped to control dispensing of an electrophilic gas exterior to the body 100 (e.g., injection of the electrophilic gas into a region of high-speed flow when the test article 10 is disposed in a hypersonic flow). The nozzle can be circular and/or conic, or the nozzle can have another shape, such as a rectangular, triangular, or star shaped exit nozzle, among other options. The forward end of the test article 10 includes an ablator 200 (e.g., an ATJ graphite ablator) coupled to a forward end of the body. The test article 10 also includes an insulating material 210 (e.g., a Saffil 1600 material) arranged between the body 100 and the ablator 200. An exterior region of the body 100 aft of the nozzle 150 has an RF window 300 disposed therein (e.g., a silicon nitride RF window). The RF window 300 can be generally coextensive with the exterior surface of the body 100 to not introduce flow disruptions around the RF window 300. The RD window 300, as shown in more detail below, can be seated in a recess in the body 100 and surrounded by a thermal protective layer 130 (e.g., Saffil 1600). FIG. 1B shows a dowel pin 103 (e.g., a silicon nitride dowel pin and/or a dowel pin of the same material as the RF window) that extends from an opening the aft end of the body, through the RF window 300, and back into the body forward of the RF window 300 to secure the RF window 300 in the recess. Also shown in FIG. 1B is the interior cavity 101 of the test article 10. The dowel pin 103 can more generally be a connector that couples the RF window 300 to the body 100. The connector can be the dowel pin 103, a pin, or other structure that extends from the body into the RF window 300.

The interior features of the test article 10 are shown in more detail in the cross-section views of FIGS. 1C and 1D. The test articles 10 includes an interior piping system 400 in the interior cavity 101 that can be integrally formed with the body 100 (e.g., by 3D printing the body 100 and piping system 400 as a single piece). The interior piping system 400 includes a standard threaded pipe interface 451, which can be any interface for connecting to a fluid source (e.g., a Swagelok VCR fitting), and also includes a fluid passageway extending therefrom with a fluid passageway 452 and throat 453 that forms the start of the nozzle 150 that extends to the exterior surface of the body 100. FIGS. 1C and 1D also show the dowel pin 103 extending through the RF window 300, as well through the thermal protective layer 130. An RF antenna 190 is positioned behind the RF window and configured to transmit RF signals out of the body 100 through the RF window. The dowel pin 103 can be long enough such that the ends of the dowel pin 103 remain disposed within the body 100 to secure the RF window 300 from being removed from the body 100. As discussed in more detail below, inward movement of the RF window 300 can be prevented by a geometric interference fit between the RF window 300 and the body 100 and the thermal protective layer 130, such that, for example, with the dowel pin 103 removed, the RF window 300 can be removed from the body 100 in a radially outward direction direct respect to the body 100, but cannot move inward beyond a designed position (e.g., when the exterior surface of the RF window 300 is coextensive with the exterior surface of the body 100). Accordingly, the dowel pin 103 being inserted through the RF window 300 and the body 100 can retain the RF window 300 in the desired position by preventing radially outward movement.

Figure 1G:
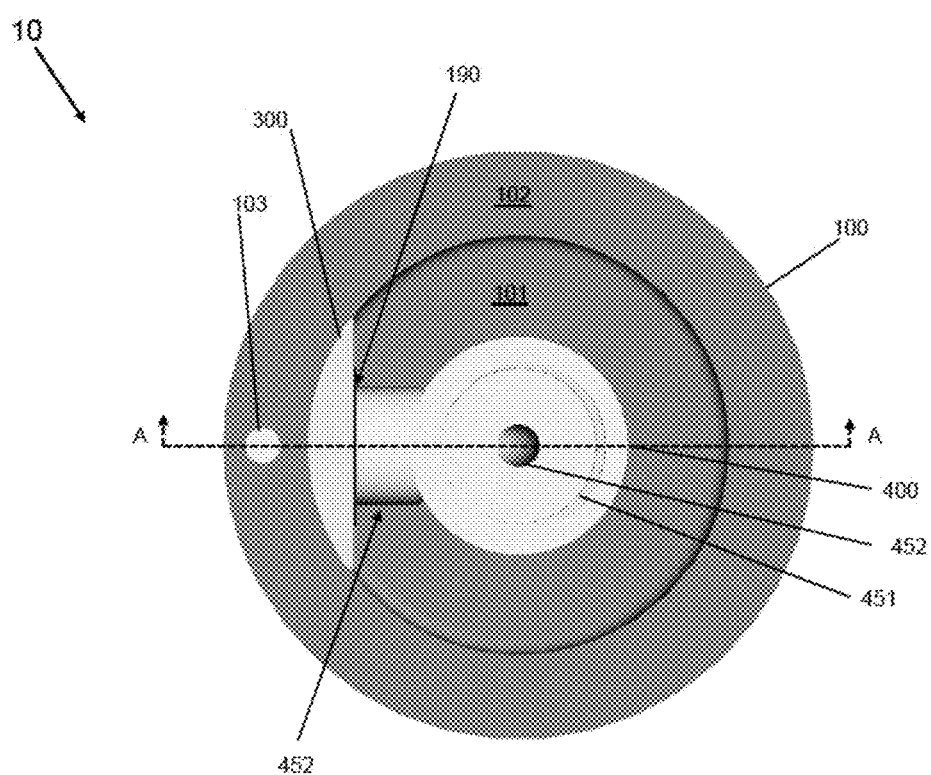
FIG. 1G is a top view of the test article of FIG. 1A.

FIGS. 1E and 1F show a side view of the test article 10 with the RF window visible. In FIG. 1E, the RF window 300 is opaque (which is how it can present it visual light, as it may only be transparent to RF frequencies), and FIG. 1F shows the RF window 300 as transparent to show the dowel pin 103 extending through the RF window 300 and the RF antenna 190 arranged behind the RF window 300. FIG. 1G shows a top-down view of the test article 10, with the piping system 400 visible, as well as the threaded pipe interface 451 and the fluid passageway 452 that leads to the nozzle 150. The RF window 300 extends inwards from the exterior of the body 100 and into the inner cavity 101, with an extreme end of the RF antenna 190 just visible beyond the backside of the RF window 300 because the RF antenna is almost completely recessed within the back of the RF window 300.

Figure 2A:
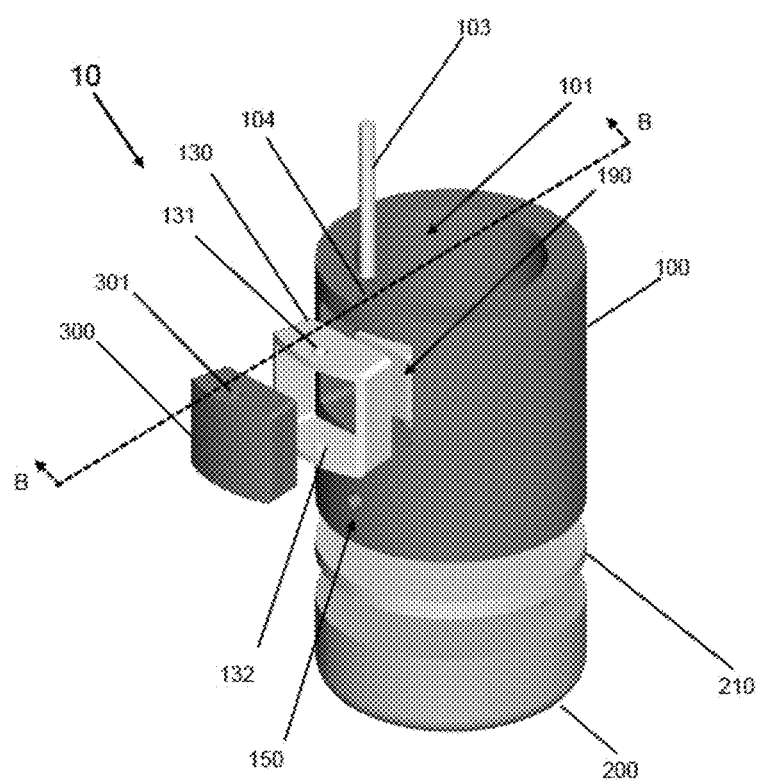
FIG. 2A is an exploded isometric view of the test article of FIG. 1A.

FIG. 2A is an exploded isometric view of the test article 10 of FIG. 1A, showing the individual components and their arrangements. The insulating material 210 can have a disk-like shape that completely covers an aft side of the ablator 200 and creates a thermal juncture between the ablator 200 and the body 100. A high-temperature adhesive (not shown, and, e.g., Ceramabond 671) can be present one or both sides of the insulating material 210 to secure the ablator 200 to the insulating material 210 and/or to secure the insulating material 210 to the body 100. The RF window 300 includes a through hole 301 that extends between a forward end and an aft end of the RF window 300 to receive the dowel pin 103. The thermal protective layer 130 surrounds the lateral periphery of the RF window 300 and includes an aft hole 131 and an opposite forward hole 132 through which the dowel pin 103 is passed though and disposed in while the dowel pin 103 secures the RF window to the body 100. As with the insulating material 210 of the ablator 200, a high-temperature adhesive (not shown, and, e.g., silicone gasket sealant) can be placed between the RF window and the thermal protective layer 130 and/or between the thermal protective layer 130 and the recess in the body 100 in which the thermal protective layer 130 and the RF window 300 sit. An insertion hole 104 in the aft end of the body 100 allows insertion of the dowel pin 103 into the body and through the RF window and thermal protective layer 130.

Figure 2B:
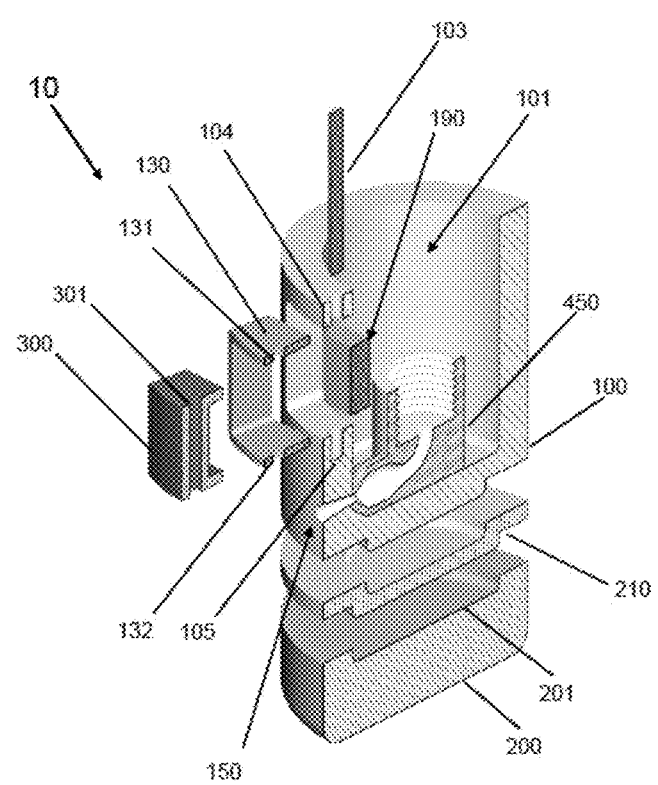
FIG. 2B is an exploded isometric cross-sectional view of the test article of FIG. 2A taken through plane B-B illustrated in FIG. 2A.
Figure 2C:
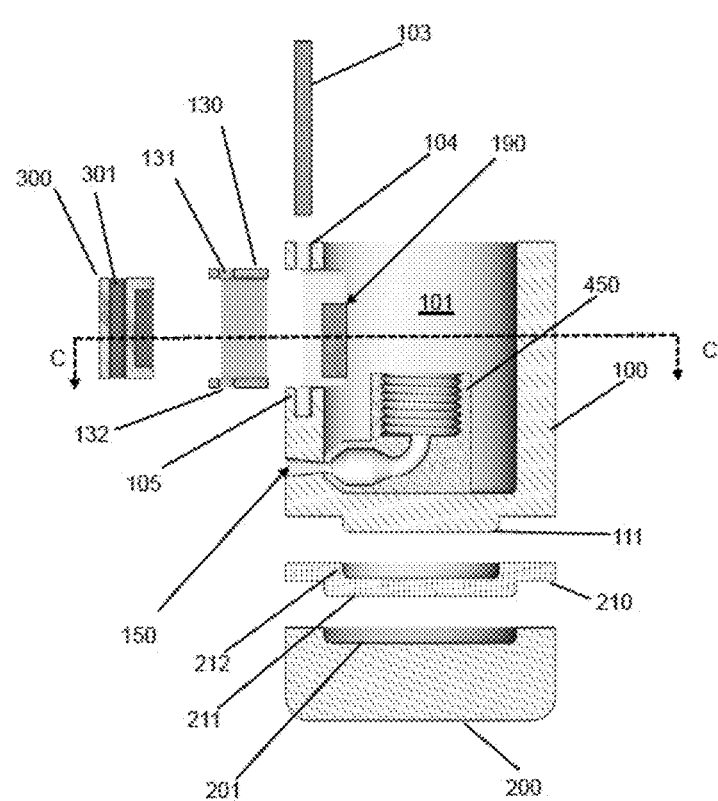
FIG. 2C is an exploded isometric side cross-sectional view of the test article of FIG. 2A taken through plane A-A illustrated in FIG. 1B.

FIGS. 2B and 2C are cross-sectional views of the exploded position of the test article 10, and a receiving hole 105 in the body 100 can be seen where the end of the dowel pin 103 enters to secure the RF window 300 to the body 100 from the opposite side of the recess in which the RF window 300 sits, when assembled. The forward end of the body includes a central protrusion 111 that assisted in mechanically fixing the ablator 200 to the body 100. Here, the insulating material 210, being positioned between the ablator 200 and the body, includes a recess 212 to receive the protrusion 111 and a corresponding protrusion 211 to extend into a recess 201 in the ablator 200. Together, the fitment of these protrusions 111, 211, and corresponding recesses 212, 201, when secured with an adhesive, improves the resistance to shear forces. If more resistance is desired, alternative configurations (e.g., as shown FIG. 6) include adding additional geometric interfaces and interferences between the ablator 200, insulating material 210, and the aft end of the body 100.

Figure 3A:
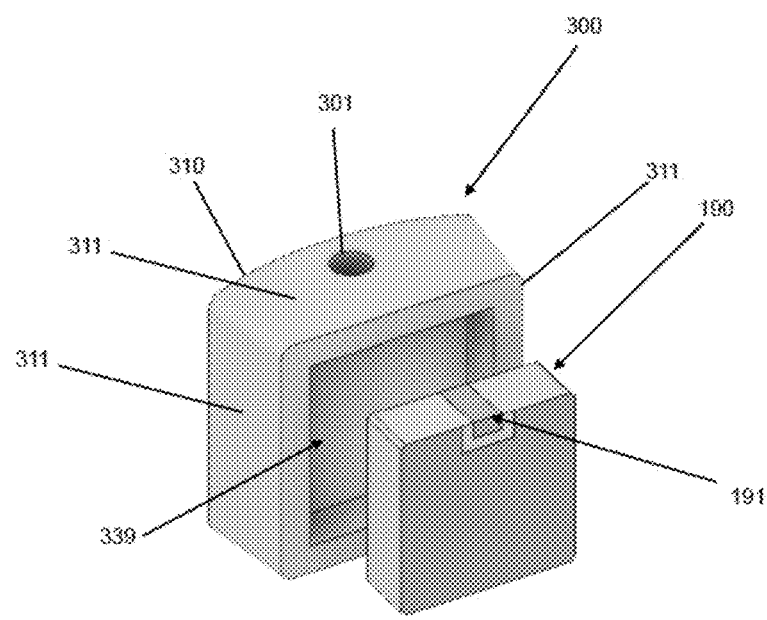
FIG. 3A is an isometric view of the unassembled RF window and RF antenna from the test article of FIG. 1A.
Figure 3B:
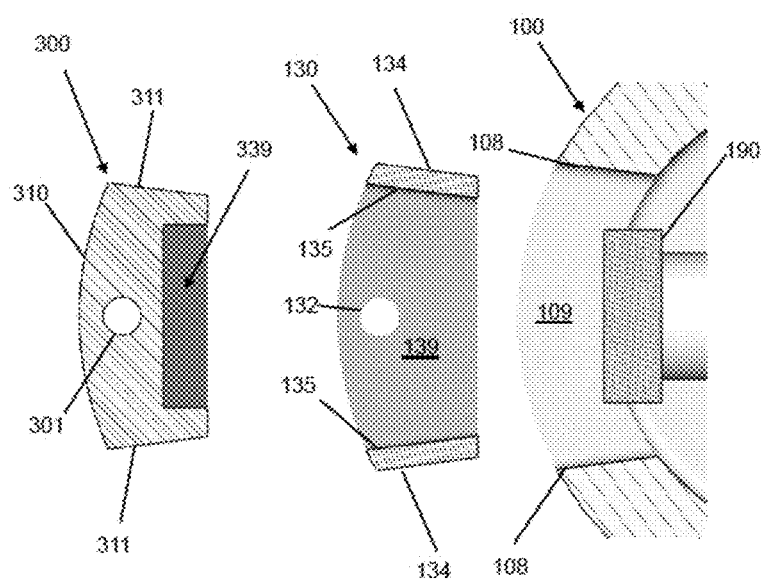
FIG. 3B is an exploded top cross-sectional view of the unassembled RF window and RF antenna from the test article of FIG. 2A taken through plane C-C illustrated in FIG. 2C.
Figure 3C:
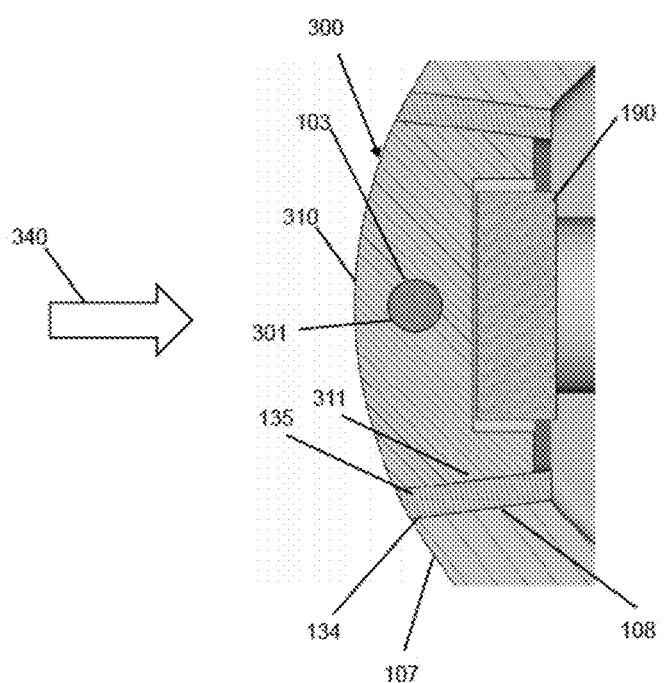
FIG. 3C is an exploded top cross-sectional view of the assembled RF window and RF antenna from the test article of FIG. 1A taken through plane D-D illustrated in FIG. 1D.

Additional details of the interface between the RF window 300, thermal protective layer 130, and the RF antenna 190 and their coupling with the body 100 are shown in FIGS. 3A-3C. In FIG. 3A, the unassembled RF window 300 and antenna 190 are shown. The RF window 300 includes a curved exterior surface 301 that can, as shown, for example, match the curvature of the exterior surface of the body 100. The back side of the RF window has a recess 339 formed therein to receive the RF antenna 190, which can be glued or otherwise fixed in place. Also visible is an electrical connection points 191 on the RF antenna 190 for transmitting a signal to the RF antenna 190 (to be emitted from the article 10) and/or receiving an RF signal from the RF antenna 190 (received by the article 10). The top side 311 and bottom side (not visible) of the RF window can be substantially parallel, but the lateral sides 311 can be angled to form a taper that matches a corresponding taper in the body 100, as shown in FIGS. 3B and 3C. FIG. 3B is a top view cross-section of the exploded arrangement of the RF window, thermal protective layer 130, and body 100. The RF antenna 190 is shown in a recess 109 in the body that receives the RF window 300 and the thermal protective layer 130, and can be, in at least some instances, physically connected to a controller or other electrical device or connection inside the interior cavity 101 of the body 100.

The recess 109 in the body 109 has inwardly tapering sidewalls 108 that define a wide opening at the exterior surface of the body than the interior surface. The thermal protective layer 130 also has inwardly tapering exterior sidewalls 134 that are arranged to sit in the recess 109 in the body. The thermal protective layer 130 includes a recess 139 to receive the RF window and the recess 139 has inwardly tapering interior sidewalls 135 that are arranged to receive the inwardly tapering sidewalls 311 of the RF window 300. In this arrangement, the RF window 300 sits in the recess 139 of the thermal protective layer 130 and the RF window and thermal protective layer 130 together sit in the recess 109 in the body. The inwardly tapering arrangement of the sidewalls 311, 134, 135, 108 defines an insertion depth of the RF window 300 in the body (e.g., such that the exterior surface 310 of the RF window is coextensive with the exterior surface of the body), as shown in FIG. 3C. In FIG. 3C, the RF window 300 and thermal protective layer 130 are seated in the recess 109 of the body 100 and the dowel pin 103 is placed through the RF window 300 and thermal protective layer 130 to secure both to the body 100. The exterior surface 310 of the RF window is coextensive with the exterior surface 107 of the body 100 and further inward movement (as indicated by arrow 340) is prevented by the geometric interference between the inwardly tapering arrangement of the sidewalls 311, 134, 135, 108. During hypersonic operation, the primary force on the RF window is exterior pressure from outside the vehicle/article. Accordingly, the tapering arrangement can provide the strongest protection by which the RF window 300 is held in place. Fluctuations in pressure can occur, and significant events can reverse this arrangement, with the pressure inside the vehicle/body being larger than outside, and the RF window 300 is prevented from moving outward by the interference with the dowel pin 103.

Figure 4:
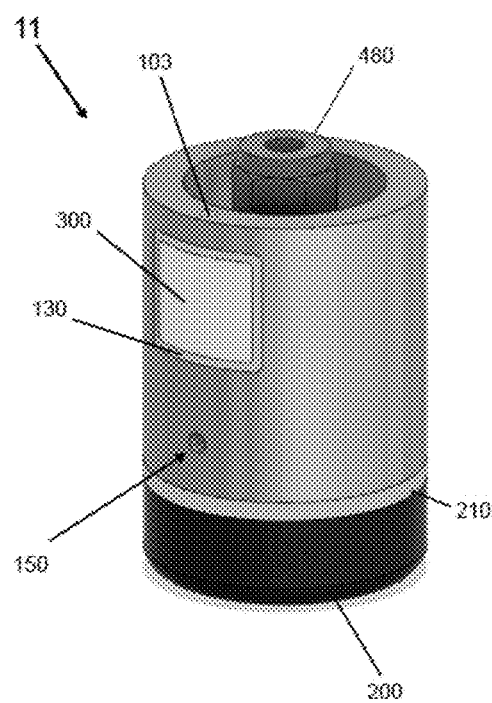
FIG. 4 is an isometric view of the test article of FIG. 1A with additional pipe fittings attached.

In operation a source of electrophilic gas or liquid is coupled with the interior piping system 400 and this can be done, for example, with a Swagelok VCR fitting connected to the standard threaded pipe interface 451, as shown in FIG. 4. Those skilled in the art will appreciate this this is just one representative example of a number of different connection means by which a system providing fluid or gas can be securely coupled with the interior piping system 400 to deliver the gas or liquid to the nozzle 150.

Figure 5:
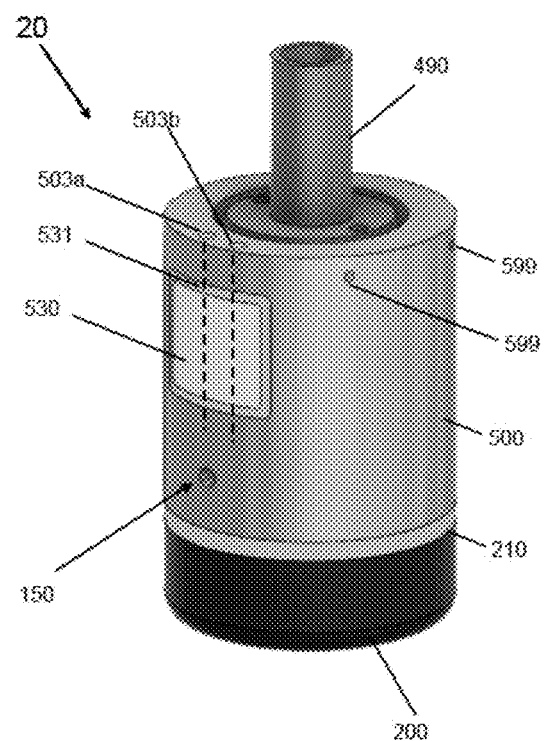
FIG. 5 is an isometric view of an example test article with two dowel pins securing the RF window.

FIG. 5 is an isometric view of an example test article 20 that that includes an RF window 530 secured to a body 500 using two dowel pins 503a, 503b that each extend through (as indicated by dotted lines) the RF window 530 and thermal protective layer 531 around the RF window 530 and back into the body 500 of the article 20. The article 20 also includes a different fluid connection system that can accommodate piping interfaces consistent with industry standards. The use of two or more dowel pins 503a, 503b can be advantageous in providing structural redundancy should one pin fail, as well as load sharing. Both the singular and two dowel pin arrangements have similar electromagnetic performance as the pins can be made of the same material as the window and should not degrade the RF windows performance. The body 500 of the article 20 also includes a plurality of holes 599 around the exterior periphery of the aft end of the body 500. These holes 599 can as pin feed-through holes to attach the test article to a sting of a hypersonic testing apparatus.

Figure 6:
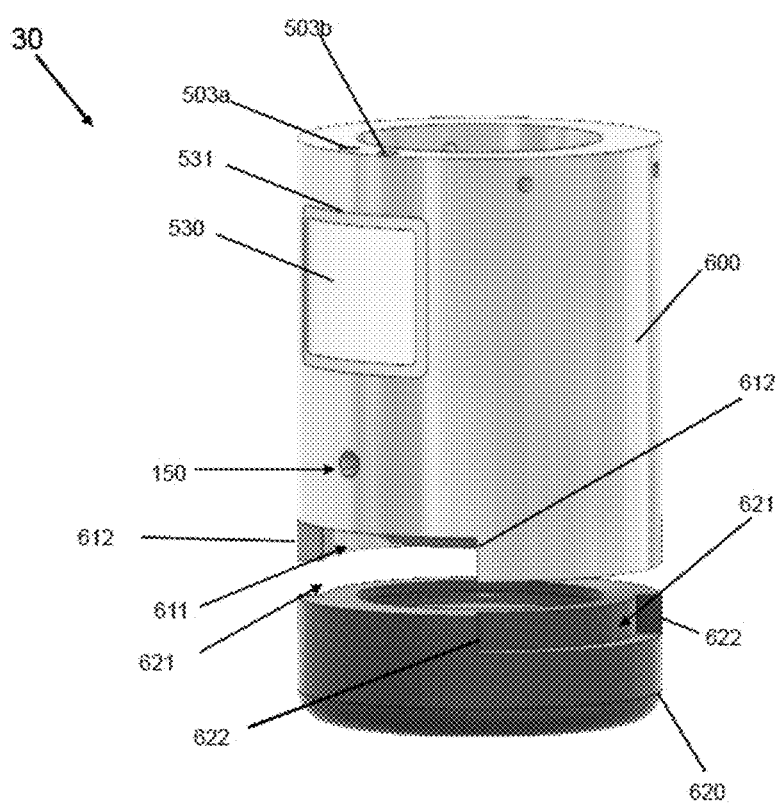
FIG. 6 is a partially exploded isometric view of another example test article, the test article having an ablator secured with interlocking teeth.

The connection between the ablator 200 and the body 100 can be a point of failure when high-shear conditions are encountered. Accordingly, examples of the present disclosure include improved coupling geometries between the ablator and the body, such as the interlocking teeth arrangement shown in FIG. 6. In FIG. 6, a test article 30 includes a body 600 with a forward end that defines a peripheral gap 611 that forms adjacent forward-extending teeth 612. The article 30 includes an ablator with an aft end that includes peripheral cut-ins 621 that are sized and shaped to receive the forward-extending teeth 612 of the body 600 when coupled. When coupled, the forward-extending teeth 612 are rotationally locked against the sides 622 of the peripheral cut-ins 621 in the ablator 600, preventing relative rotation about the central axis. Other geometric arrangements that rotationally constrain are considered as well, such as crenellations, dowels and holes, and radially-extending fins and slots, among others. One skilled in the art will appreciate that examples include a number of other ways to geometrically constrain the ablator to the body to prevent relative rotation.

FIG. 7 is a schematic illustration of a hypersonic test being conducted with a test article according to examples of the present disclosure. The test includes a hypersonic wind tunnel 760 in which the test article 10 of FIGS. 1A-3C is disposed and held by a sting 761. The sting supports the article in the hypersonic wind tunnel 760 and provides a source of electrophilic gas (e.g., $SF_6$) to the nozzle 150 via a connection to the interior piping system 400. In the test example of FIG. 7, an $SF_6$ injection mass flow rate can, for example, be about 2e-2 kg/sec (about 20 grams/sec) at about 1 MPa (about 145 PSI) through the sting 761 feed-through. The interface to the test article 10 can use a Swagelock NPT compression straight adapter fitting 762 to couple with the standard threaded pipe interface 451 of the interior piping system 400. The hypersonic wind tunnel 760 produces a high-speed flow 70 (e.g., Mach 4.5 or higher) that impinges on the article 10. The article 10 is arranged with respect to the high-speed flow 70 such that the forward end of the article, which is the ablator 200, is pointed directly into the high-speed flow 70. The interaction with the high-speed flow 70 and the ablator 200 creates a bow shock 71 that forms around the article 10, defining the forebody region of flow across the forward end of the ablator 200. Downstream of this bow shock 71, in the aftbody region of the flow, the nozzle injects the electrophilic gas and this electrophilic gas moves into and downstream with the high-speed flow 70, where the plasma in the flow, specifically in the region adjacent to and/or above the RF window 300 is quenched. This quenching enables an RF signal 730 to be transmitted by the antenna 190, through the RF window 300, through the region in the aftbody flow where the electrophilic gas is present, and be received by an RF antenna 770 disposed on a surface of the hypersonic wind tunnel 760.

FIG. 8 is an isometric view of a larger example test article 40 shaped as a reentry vehicle. The test article 40 includes a hollow conical body 800 with an inner cavity 801 where an interior piping system (e.g., 400 of FIG. 1C). The exterior of the body 800 includes a nozzle 850 configured to inject an electrophilic gas into a plasma region above the exterior. The exterior of the body 800 also includes an RF window 830 and thermal protective layer 831, which can have the securing and seating arrangement according to any of the examples herein. The forward end of the article 40 includes an ablator 820, which has a thermal protective material 821 disposed between the ablator 820 and the body 800. The body 800 can be monolithic and 3D printed of a high-temperature material, such an Inconel.

FIG. 9 is an illustration of a space flight vehicle 900 conducting a reentry operation and using an RF black mitigation system according to aspects of the present disclosure to maintain RF communications during a traditional blackout period. The vehicle 900 is a typical space capsule design, with a blunt forward ablator 920 that terminates aft of a shoulder 921 of the capsule (e.g., the widest portion). The vehicle 900 has an RF blackout mitigation system that includes an exterior nozzle 950 configured to inject a electrophilic gas (e.g., $SF_6$) into the plasma flow downstream of the shoulder 921 (e.g., into the aftbody flow region) and an RF window 930 with an RF antenna 931 located on the exterior of the vehicle 900 at a location downstream of the nozzle 950. The RF blackout mitigation system further includes a source 52 of the electrophilic gas that is connected to the nozzle 950 by a controller 53 that controls the dispensing of the electrophilic gas to the nozzle 950. The vehicle 900 also includes a communications unit 51 that is in electrical communication with the RF antenna 931 to provide RF communications external to the vehicle 900 via the antenna 931.

A typical space capsule conducting a reentry operation has an S-band blackout period of about four (4) minutes, which corresponds roughly to an altitude change from an altitude of about 300,000 feet above sea level to about 160,000 feet above sea level. In operation, with the vehicle 900 conducting a reentry flight into hypersonic air 90, a bow shock 91 forms near the ablator 920 and generates a plasma region that flows through the aftbody region along the vehicle 900. Without the RF mitigation system, the antenna 931 cannot transmit a signal 938 to a satellite 99 (or other communication device, such as a ground-based system) because the free ions in the plasma region significantly attenuates the signal 938. The RF blackout mitigation system engages by the controller 53 releasing a flow of electrophilic gas from the source 52 that flows to the nozzle 950 and is injected into the plasma region upstream of the RF window 930 and flows (shown as a spreading flow 951) into the region of plasma above and/or adjacent to the RF window 930. With the electrophilic gas mixing into the plasma, free ions in the plasma are quenched to a degree to enable the signal 938 to pass through the aftbody region without significant attenuation (e.g., sufficient to maintain communication with a satellite 99). Additionally, in operation, the RF blackout mitigation system can enable RF communications to be received as well, such as an RF signal 98 from a satellite 99.

As a representative example, an approximate flow rate of sulfur hexafluoride is approximately 0.01 kg/second, which consumes a total of about 2.5 kg during four (4) minutes to maintain RF communications. Examples include dynamically adjusting the flowrate or other injection parameters (e.g., angle, pressure, dispersion) in response to changing atmospheric conditions as determined by, for example, signal quality, such as bandwidth and amplitude.

The RF window 930 and nozzle 950 can be configured and arranged on the vehicle 900 according to any of the examples and aspects disclosed herein. As an example, the region of the exterior of the vehicle 900 having the nozzle 950 and RF window 930 can be a single unit (e.g., a monolithic piece of Inconel that has the nozzle 950 integrally formed herein and contains the recess seating the RF window) that is integrated into the exterior of the vehicle 900. Alternatively, the nozzle 950 could be at a separate location (e.g., not formed into a shared single piece of material, but still, for example, integrally formed into an exterior surface plate of material, such as Inconel) and the RF window could be integrated into a separate piece of material at its respective location downstream from the nozzle 950. In any of these armaments, the RF window can include any of the features disclosed herein, such as being made from a single monolithic piece of silicon nitride, being secured to the vehicle 900 by sitting in a tapered recess to prevent inward movement and having a dowel pin preventing outward movement, and the dowel pin can be made from the same material as the RF window 930 (e.g., silicon nitride).

Those of ordinary skill in the art will appreciate that the specific size and shape of the vehicle 900 can determine the arrangement of the nozzle 950 and RF window 930 due, at least in part, to the need to have the injection of electrophilic gas quench ions in the plasma region through which a signal from the RF window 930 needs to travel to reach a designated communication receiver. Moreover, examples can include more than one nozzle 950 as well as more than one RF window 930—multiple nozzles may be needed to achieve the necessary plasma quenching volume and multiple RF windows may be need to support different communication frequencies and/or different communication directions (e.g., one for satellite communication and one for ground-based communication).

Implementation of these systems into a physical flight vehicle would typically require the electrophilic gas to be carried onboard. As such, the test articles must be changed should they be scaled up to incorporate a tank in lieu of piping interfaces to tanks external to the article itself. Additionally, nozzle geometries may need to change to allow for structural integration in a flight vehicle. Non-limiting examples of nozzle geometries that can be used include circular, conic, rectangular, triangular, and/or star shaped, among other options.

One skilled in the art will appreciate further features and advantages of the disclosures based on the provided for descriptions and embodiments. Accordingly, the inventions are not to be limited by what has been particularly shown and described. For example, although the present disclosure provides for conducting RF blackout mitigation during spacecraft reentry, the present disclosures can also be applied to other types of hypersonic vehicles, such as missiles, drones, and transport craft. All publications and references cited herein are expressly incorporated herein by reference in their entirety.

What is claimed is:

1. A test article for mitigating RF blackout in a hypersonic flow using electrophilic gas injection, the test article comprising:
   a body having a forward end an and aft end, the body defining an exterior surface configured to be exposed to the hypersonic flow, the exterior surface having a nozzle integrally formed therein;
   an ablator coupled to the forward end of the body, the ablator being configured to be directly exposed to the hypersonic flow and direct the flow around the body;
   an RF window disposed in a recess in the exterior surface of the body, the RF window defining an exterior surface coextensive with the exterior surface of the body; and
   a connector extending through the RF window and from a first opening in a first side of the recess to a second opening in a second opposite side of the recess,
   wherein the nozzle is located upstream of the RF window with respect to a direction of the hypersonic flow after being deflected by the ablator.

2. The test article of claim 1, wherein the RF window comprises silicon nitride.

3. The test article of claim 2, wherein the RF window is monolithic structure of silicon nitride formed by at least one of injection molding or sintering.

4. The test article of claim 1, wherein the RF window and the connector are constructed from the same material.

5. The test article of claim 1,
   wherein the RF window comprises a first lateral side and a second opposite lateral side that together define an inward taper, and
   wherein the first side of the recess and the second opposite side of the recess define a corresponding inward taper such that the RF is constrained from moving further into the recess by a geometric interference between the first and second lateral sides of the RF window and the first and second sides of the recess.

6. The test article of claim 1, further comprising:
   a thermal insulation surrounding a periphery of RF window between the RF window and the body, the connector extending through a first opening in the thermal insulation adjacent to the first side of the recess and through a second opening in the thermal insulation adjacent to the second side of the recess.

7. The test article of claim 1, further comprising a high-temperature thermal insulation disposed between an aft end of the ablator and the forward end of the body.

8. The test article of claim 1, wherein the ablator comprises graphite.

9. The test article of claim 1, wherein the ablator is rotationally fixed to the forward end of the body with a set of interlocking teeth.

10. The test article of claim 1,
    wherein the body is tubular, and
    wherein the connector extends through the body and RF window substantially parallel to a central axis of the body.

11. The test article of claim 1, wherein the body is monolithic.

12. The test article of claim 11, wherein the body defines an interior cavity, the body comprising:
    a coupling within the interior cavity, the coupling configured to receive a supply of fluid; and
    a fluid passageway connecting the interior coupling with the nozzle.

13. The test article of claim 11, wherein the fluid passageway is at least partially formed by 3D printing the body to include the fluid passageway.

14. The test article of claim 1, wherein the nozzle is configured to inject sulfur hexafluoride into the hypersonic flow such that the sulfur hexafluoride quenches ions in a region of the hypersonic flow adjacent to and/or above the RF window.

15. A method of mitigating blackout of communication of a flight vehicle during reentry or hypersonic flight, the method comprising:
    injecting an electrophilic gas from an exterior nozzle of the flight vehicle, the injecting transporting the electrophilic gas into a region of plasma generated by the interaction between an exterior of the flight vehicle and a hypersonic airflow, wherein the region of plasma is located at least one of adjacent to or above an RF window on the exterior of the flight vehicle; and
    transmitting a radio signal from an antenna located behind the RF window, the radio signal penetrating the region of plasma due to ion quenching by the electrophilic gas in the region of plasma.

16. The method of claim 15,
    wherein the RF window is disposed in a recess in the exterior surface located downstream of the exterior nozzle with respect to the region of plasma,
    wherein an exterior surface of the RF window is coextensive with the exterior surface of the vehicle,
    wherein the RF window is coupled to the flight vehicle with a connector that extends through the RF window and into the flight vehicle at opposites sides of the RF window,
    wherein the dowel pin is made from the same material as the RF window, and
    wherein the RF window comprises a first lateral side and a second opposite lateral side that together define an inward taper, and wherein the recess in the exterior surface of the flight vehicle defines first and second opposite sides with a corresponding inward taper such that the RF window is constrained from moving further into the recess by a geometric interference between the first and second lateral sides of the RF window and the first and second sides of the recess.

17. The method of claim 15, wherein the RF window is monolithic structure of silicon nitride.

18. An RF blackout mitigation system for use in a flight vehicle, the system comprising:
    an electrophilic gas injection system comprising:
        an injection nozzle formed in an exterior surface of the flight vehicle at a location downstream of a stagnation region during hypersonic travel; and
        a source of an electrophilic gas;
    a controller configured to control flow of the electrophilic gas through the injection nozzle;

an RF window disposed in a recess of the exterior surface of the flight vehicle, the RF window defining an exterior surface coextensive with the exterior surface of the body; and a connector extending through the RF window and from a first opening in a first side of the recess to a second opening in a second opposite side of the recess.

19. The system of claim 18, wherein the RF window comprises a first lateral side and a second opposite lateral side that together define an inward taper, and wherein the recess in the exterior surface of the flight vehicle defines first and second opposite sides with a corresponding inward taper such that the RF window is constrained from moving further into the recess by a geometric interference between the first and second lateral sides of the RF window and the first and second sides of the recess.

20. The system of claim 18, wherein the RF window is monolithic structure of silicon nitride, and wherein the connector is made from the same material as the RF window.

21. The system of claim 18, wherein the electrophilic gas comprises sulfur hexafluoride.

\* \* \* \* \*